May 7, 1957 G. V. DYROFF ET AL 2,791,698
APPARATUS FOR X-RAY ANALYSIS OF LIQUID MATERIALS
Original Filed March 28, 1955 2 Sheets-Sheet 1
FIG. 1
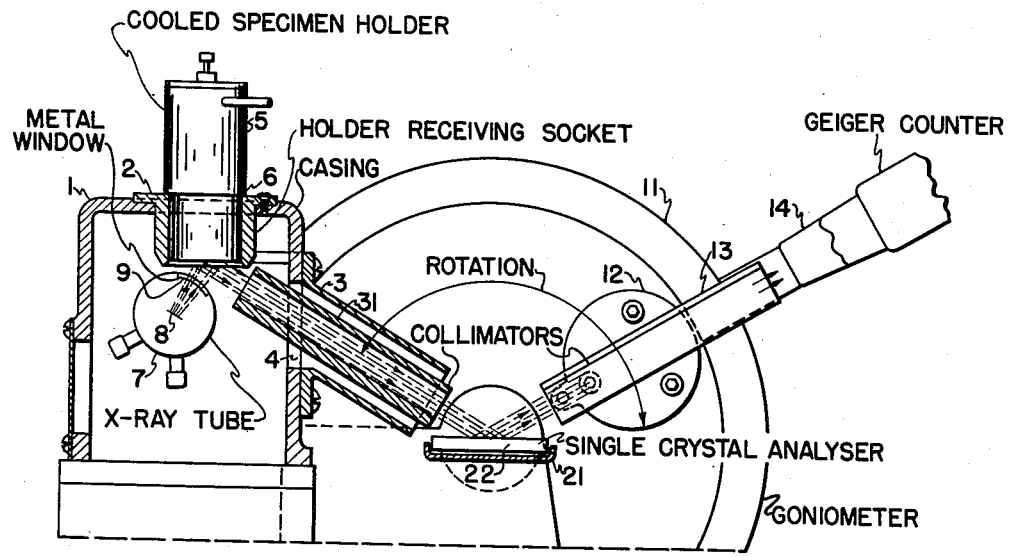
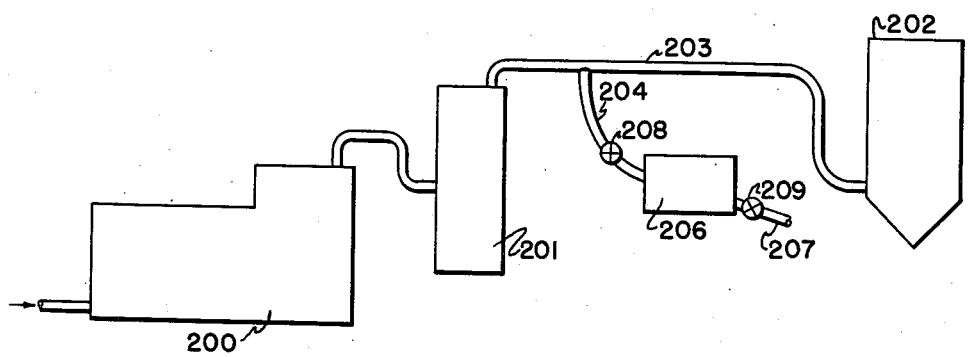
FIG. 4
George V. Dyroff
Paul Skiba, Jr.      Inventors
August Y. Mottlau
By *George J. Silhany*      Attorney May 7, 1957 G. V. DYROFF ET AL 2,791,698
APPARATUS FOR X-RAY ANALYSIS OF LIQUID MATERIALS
Original Filed March 28, 1955 2 Sheets-Sheet 2

George V. Dyroff
Paul Skiba, Jr.    Inventors
August Y. Mottlau

By *George J. Silhavy*   Attorney

United States Patent Office 2,791,698
Patented May 7, 1957

2,791,698

APPARATUS FOR X-RAY ANALYSIS OF LIQUID MATERIALS

George V. Dyroff and Paul Skiba, Jr., Union, and August Y. Mottlau, Clark, N. J., assignors to Esso Research and Engineering Company, a corporation of Delaware Continuation of abandoned application Serial No. 497,194, March 28, 1955. This application December 19, 1956, Serial No. 629,420

7 Claims. (Cl. 250—43.5)

The present invention relates to apparatus for X-ray analysis of liquid materials for the spectographic determination of the components thereof. More particularly, this invention is concerned with such apparatus in its employment of X-ray analysis for the spectographic determination of the presence of metals and metallic compounds in liquids, and especially liquid hydrocarbons such as may be employed as feed stocks for catalytic cracking systems. This invention relates more specifically to a device for holding a liquid sample in the path of a stream of X-rays, wherein the device automatically presents a predetermined thickness of sample to the action of the X-rays, while simultaneously affording a means for enhancing the effect of said X-rays on the sample.

The invention is set forth herein as a continuation of our co-pending application Serial No. 497,174, filed March 28, 1955, now abandoned.

In the catalytic cracking of hydrocarbon oils, it is well known that the activity of the catalyst employed is adversely affected by the presence of certain metals or metallic compounds in the materials brought into contact with the catalyst during progress of the catalytic reaction. By the deposition of even minute quantities of such metals and compounds on the catalyst particles, the catalyst is contaminated. Such contamination is indicated by, and results in, an undesirable increased production of hydrogen with a corresponding reduction in efficient operation of the system for the recovery of gasoline and other desired hydrocarbon materials. Such contamination may result in an increase in hydrogen production from a normal production in the range of from about one to about ten volume percent, to a production in the range of from about ten to about thirty volume percent. The light ends handling facilities of the system may thus become overloaded beyond their design capacity, necessitating cut-backs in the initial feed of cracking stock, and resulting in a reduced production of useful and valuable products.

The detrimental effect of catalyst contamination by certain metals and their compounds has been recognized for some time. Many procedures have been suggested for the removal of such metals from feed stocks as supplied to a catalytic reactor, as well as for removing contaminants after they have been deposited on the catalyst materials. Such procedures would require considerable investments for additional equipment for processing feed stocks in addition to increasing maintenance and operating costs. Such procedures, also, in the absence of means to determine the contaminant content of feed stocks, would require "total treatment" systems wherein the entire feed to a catalytic reactor must be treated continuously in order to avoid contamination by any particular portion thereof.

Efforts have been made to avoid the necessity for "total treatment" systems as by intermittent analysis of feed stocks. Most analysis methods, however, have required an extended series of steps which involve hours or even days for completion. Such methods may not be employed effectively where the character of the feed stock may change during the time taken for the analysis of any given sample. What is needed is an analysis method and apparatus which will provide a determination of feed characteristics quickly enough to permit accomplishment of corrective action within minutes rather than hours or days. Such a method and apparatus most desirably should provide for direct sampling, and immediate analysis of the feed stock at regular intervals, but alternatively samples may be withdrawn and removed to laboratory facilities for analysis, provided the time interval between sample withdrawal and completed analysis is not excessively protracted.

Analysis by the X-ray fluorescence technique has been found to offer attractive potentialities, and several types of equipment have been developed for this purpose. Such techniques have been employed successfully for the determination of the extent to which a solid material, such as a powdered cracking catalyst has been contaminated by metals such as iron, nickel, and vanadium, and their compounds. It is obvious, however, that while the results of such determination may be useful to indicate the need for catalyst replacement, it would be more desirable to determine the existence of such contaminants in the materials which are to be brought into contact with the catalyst, and as a result of such contact tend to produce degradation of the catalyst.

The application of X-ray fluorescence techniques to the inspection of liquids has not been successful, however, for several reasons. To a large extent, the lack of success has been due to an inability of existing equipment to provide for reproducible sample volumes and depths, and the interference of "background" fluorescence created by the sample holder. It is an object of the present invention to overcome these defects in such equipment, primarily by improving the geometry of the related apparatus elements, and by providing improved sample holding means. It is also an object of this invention to provide a sample holder which includes a means for reducing background interference and for enhancing or intensifying the peak height of fluorescent radiation of the metallic components of the sample under influence of X-ray radiation of the sample. It is a further object of the invention to provide a sample holder wherein the contained sample may be maintained at a constant temperature, and additionally may be adapted to direct sampling and process control procedures. A still further object is to provide an X-ray analysis system suitable for employment as a means for controlling the content of metals and metal compounds in the feed as supplied to a treating or reaction process.

The invention and its objects may be more clearly understood from the following description, when it is read in conjunction with the following drawings, in which:

Fig. 1 is a schematic illustration of an X-ray fluorescence analyzer apparatus, showing the geometry of related elements according to this invention;

Fig. 4 is a schematic showing of the application of an analyzer according to Fig. 1, employing a sample holder according to Fig. 3, to a system for controlling the metal content of the feed stream to a catalytic cracking reactor.

Figure 2:
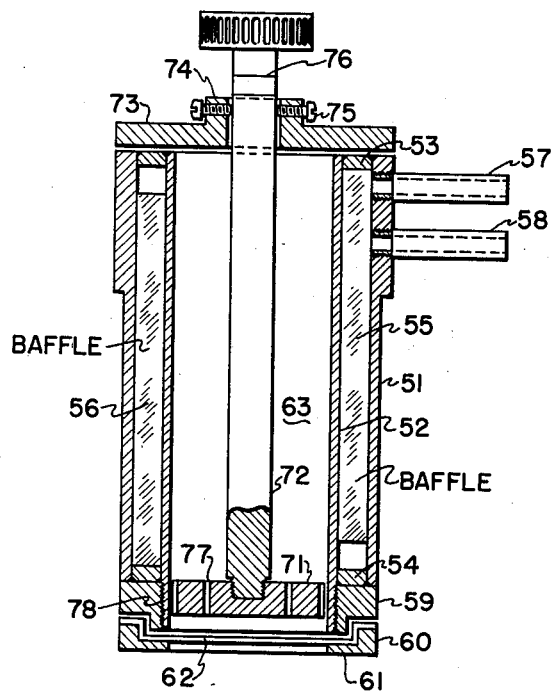
Fig. 2 is an enlarged and more detailed illustration of the sample holder of Fig. 1, partly in vertical section.

Referring to the drawings in greater detail, wherein like parts are designated by the same numerals, in Fig. 1, the numeral 1 designates a housing unit. Included as parts thereof are a sample holder socket or thimble 2 supported on the upper wall of the housing 1 and extended downwardly therethrough, and a flanged tubular housing extension shield 3 opening from a sidewall port 4 in the housing to extend angularly downward therefrom. In the structure as shown, the thimble 2 and the shield 3 are disposed so that longitudinal axis of the shield and the vertical axis of the thimble lie in the same vertical plane, with the longitudinal axis of the shield inclined downwardly from a horizontal plane common to the lower end of the thimble 2 and along a line which intersects the thimble axis in that plane as shown. The thimble 2 is adapted to receive a sample holder, designated by the numeral 5 in Fig. 1 and illustrated in greater detail in Fig. 2. Also as shown, the sample holder 5 is supported in and concentric with the thimble 2 by means of an annular radial shoulder 6, formed in the outer surface of the holder, which bears upon the upper and outer end of the thimble 2. The lower or inner end of the sample holder 5 terminates in substantially coplanar relation to the inner end of the thimble 2.

An X-ray tube 7 is extended horizontally into the housing 1 in substantially right angular relation to the plane which is common to the longitudinal and vertical axes of the shield 3 and thimble 2 respectively, with the tube below and offset from the thimble in a direction diametrically opposite to the shield 3. According to conventional construction, the tube 7 is provided with a target element 8, and an aligned X-ray discharge "window" 9. In the structure contemplated, the tube 7 is disposed so that the target 8 is substantially centered on and in right angular relation to a radius of the tube which lies in the aforementioned plane common to the vertical and longitudinal axes of the thimble 2 and shield 3 respectively, and which also is substantially aligned with the center of the thimble 2 and in right angular relation to the longitudinal axis of the shield 3. Preferably the target element 8 is formed of high grade tungsten, which contains a minimum amount of impurities in the form of iron, nickel, vanadium, or other substance likely to be included or contained in the substance to be analyzed, and to be determined by such analysis. The window 9 is preferably of beryllium, but may be mica, or Lindeman glass.

Associated with the apparatus thus far described, is a goniometer plate 11 of which the inner face, presented in Fig. 1, lies substantially in a plane parallel to that which is common to the longitudinal and vertical axis of the shield 3 and thimble 2 respectively. The plate 11 is disposed for rotation on a horizontal axis which intersects the axis of shield 3 at right angles thereto, and is at right angles to the aforementioned planes. The plate 11 is disposed for rotation about its axis by any suitable means, not shown, through an arc of at least 165°, from a zero point which is below a horizontal plane through the plate axis, as well as that which is common to the lower or inner end of the thimble 2 and/or sample holder 5, and which is in a vertical plane common to that through the axes of the shield 3, and of the thimble 2. In a preferred form, this zero point is 30° below the horizontal planes mentioned. Mounted on the goniometer plate 11, is a bracket 12 adapted to support a collimator 13, and a Geiger counter 14. The collimator 13 is a hollow cylindrical shell, in which may be disposed a bundle of elongated tubular elements coextensive with the shell and parallel to the axis thereof. Both the collimator and the Geiger counter are aligned coaxially and "sighted" so that their comomn axis is parallel to a radius of the goniometer plate 11, and lies substantially in the same vertical plane as that which is common to the longitudinal axis of the shield 3 and the vertical axis of the thimble 2 and/or holder 5.

A bracket 21 is mounted for rotation about the axis of the plate 11 also. This bracket 21 is adapted to support a diffraction crystal 22 with the upper surface of the crystal in a plane common to that of the plate axis, and in a position such that the vertical plane common to the longitudinal axis of the shield 3 and to the vertical axis of the thimble 2 and/or holder 5 passes through the surface of the crystal in substantially right angular relation thereto. The bracket 21 is arranged for rotation in unison with the plate 11, and preferably by the same means, but at a rate which is one half that of the plate 11 and bracket 12. Initially, the bracket 21, with crystal 22, the collimator 13 and Geiger counter 14 on bracket 12 are aligned in such fashion that the axis of the collimator 13 and Geiger counter 14 as well as the surface of the crystal are common to a line extensible through the axis of the plate 11 and the center of the thimble 2 and/or holder 5 at the lower or inner ends thereof.

Substantially coextensive with the shield 3, is a second collimator 31. This collimator is similar to the collimator 13 previously mentioned, but whereas the shell of collimator 13 may contain a bundle of tubular elements, the collimator 31 preferably contains one or more transverse discs each defining a diametric slot, and where a plurality of such discs are employed, wherein the slots are in a parallel and longitudinal alignment. In the drawing described, both discs and tubular elements have been omitted for simplification, as both forms of collimator are well known in the art. The collimator 31 is adjustably supported in the shield 3 for substantially coaxial alignment therewith.

In Fig. 2 is shown the structure of the sample holder designated in Fig. 1 by the numeral 5. In the view of Fig. 2, the numeral 51 indicates the tubular outer wall of the device, while the numeral 52 indicates a tubular inner wall of lesser diameter disposed concentrically of 51 to provide an annular space between them. At their upper ends, the wall members 51 and 52 are connected by means of an annular ring 53, press-fitted between them and then welded to form a fluid tight seal. At their lower ends, the inner wall member 52 is extended beyond the outer wall member 51, the space between wall members being closed by a ring 54 at the level of the lower end of the wall member 51 and disposed in the manner of ring 53. The space between wall members 51 and 52 is thus closed to form an annular chamber. The chamber as shown is divided into sections by means of vertical baffles such as baffles 55 and 56. An inlet conduit such as indicated by the numeral 57 provides for the introduction of a heat exchange fluid into the chamber on one side of the baffled chamber, while an outlet conduit such as indicated by the numeral 58 provides for withdrawal of the heat exchange fluid from the other side of the chamber.

The lower end of the sample holder is suitably provided with a closure for the lower end of the inner tubular wall member 52. As shown, the extended portion of the wall member 52 is exteriorly threaded to receive a first ring 59, machined to provide a shouldered enlargement of the member 52, which is adapted to receive a second ring 60 in press fitted relation. The ring 60 is provided with an annular flange 61 extending radially inward, and having an inner diameter equal to that of the wall member 52. When assembled the flange 61 substantially engages the end of the ring 59 and the end of the wall member 52. A diaphragm closure for the assembly is indicated by the numeral 62. As shown the closure is a thin sheet of a plastic material stretched over the end of the member 52 and ring 59 to be held in fluid tight relation thereto by means of the ring 60. Although a mica disc, Lindeman glass, or even a thin metal disc of a metal such as beryllium may be used as the closure means, it is preferred that the closure be formed from a material such as "Mylar," which is a high molecular weight polyester material produced from ethylene glycol and terephthalic acid by condensation, the compound being known as polyethylene terephthalate. This material has the characteristic of extremely low absorption for X-rays and any secondary radiations produced thereby. It also has a high tensile strength even in thin films of a thickness as low as about ¼ mill. Due to its extreme lack of absorption for X-ray, however, this material may be used in any thickness required for the service intended. With the closure applied, a sample chamber 63 is formed within the wall member 52.

Also included as functional parts of the sample holder are a plunger disc 71, plunger rod 72 and closure plate 73. The plunger disc 71 is of a diameter substantially equal to the internal diameter of the tubular wall member 52, in which it is adapted to fit in longitudinally slideable, transverse relation. It is of a thickness adequate to provide rigidity and permit suitable machining of the lower face and edge portions, and also to provide for threaded engagement with plunger rod 72 at the lower or inner end thereof.

The rod 72 is of a length somewhat greater than the distance from the closure 62 to the upper end of the device. The upper or outer end of the plunger rod 72 extends through a central passage in the plate closure element 73 and a central raised boss 74 on the upper or outer surface thereof, the rod 72 being reciprocally moveable through said passage. Means such as set screws 75 are provided in the boss to hold the rod in any desired fixed relation to the plate or boss, and consequently to hold the disc 71 in any desired relationship to the closure disc 62. Suitably spaced indicia lines 76 are shown which encircle the upper end of the rod 72, providing gauge markings whereby the space relation of the lower surface of the disc 71 to the upper surface of the closure 62 may be accurately determined. The disc 71 as shown is further characterized by a series of passageways 77 extended vertically through the thickness of the disc and opening through both upper and lower surfaces. Alternately, or in addition to such passageways 77, the edge of the disc may be provided with a plurality of vertical grooves or slots 78 disposed in circumferentially spaced relation, peripherally of the disc.

In operation of the apparatus as represented by Fig. 1, and using a sample holder such as illustrated by Fig. 2, a liquid material is first introduced into the chamber 63. The sample holder is then inserted in the thimble 2. The outer end of the plunger rod is inserted through the central passage in the cover plate 73 and boss 74, and as previously determined, is positioned in fixed relation therein, by means of set screws 75 so as to provide a certain clearance between the under surface of the disc 71 and the upper surface of the diaphragm closure 62. Normally, this clearance will not be more than ¼ inch, and preferably about ⅛ inch, but this clearance depends to some extent on the viscosity and density of the liquid as well as upon the estimated content of the material to be discovered by analysis. With the plunger rod and disc set in the cover plate for the desired clearance, the assembly is inserted in the chamber and permitted to sink through the liquid sample until the cover plate comes to rest on the upper end of the sample holder. The excess of sample liquid flows through the passages 77 and 78 as the plunger sinks. An excess of the sample is desirable in order to facilitate maintenance of substantially a constant temperature in the material exposed below the plunger disc 71. Although other means may be employed, in the sample holder as shown, a heat exchange fluid such as water is circulated through the annular space between the members 51 and 52 by way of the conduit connections 57 and 58 into indirect heat exchange relation with the excess of sample above the disc 71 and also by contact between the disc and wall member 52. In turn the exposed sample portion below the disc 71 is in heat exchange relation to the disc and to a slight extent, by convection, with the body of excess sample above the disc. The purpose of such heat exchange relationship is primarily to maintain a substantially constant density of the exposed sample below the disc, with a minimum effect thereon by temperature changes. Such temperature changes may be occasioned not only by variations of ambient temperature but also and primarily as a result of X-ray irradiation of the exposed sample.

With the sample and holder in place, the exposed portion of the sample is subjected to X-ray irradiation from the tube 7, substantially as indicated by broken arrows in Fig. 1. It is well known that when so irradiated, the various component elements of the sample material fluoresce in characteristic fashion, each element emitting secondary rays, identified as K-rays. For each component or contained element the K-rays emitted are known to have a substantially specific wave length. This characteristic is especially identifiable with metals and their compounds. For example, iron, nickel and vanadium exhibit characteristic K-ray wave lengths of about 1.94, 1.66 and 2.50 A. units respectively when irradiated with X-rays, using a tungsten target at 35 kv. and 20 ma. for iron and nickel and 50 kv. and 50 ma. for vanadium. An additional characteristic of each component, when so irradiated, is that each distinctive wave length attains a maximum measurable intensity or peak when diffracted and reflected by a crystal, such as a lithium fluoride crystal, interposed in the ray path at a specific angle substantially according to the Bragg formula $$N \rightarrow = 2d \sin \theta.$$

Thus, for iron the peak intensity is obtained with the crystal at a Bragg angle of 57.25° ($2\theta$); for nickel at a Bragg angle of 48.5° ($2\theta$); and for vanadium at Bragg angle of 76.6° ($2\theta$). In the apparatus as shown, the bracket 21 and crystal 22 may be rotated so as to present the crystal surface to the rays issuing from the fixed collimator 31 at any desired angle. The collimator 31 serves to render the rays parallel, and to direct them toward the axis of the bracket, and thereby the surface of the crystal.

In order to measure the intensity of the rays reflected from the crystal it is essential that the measuring means, such as the Geiger counter, indicated in Fig. 1 by the numeral 14, be sighted on the crystal at an angle substantially equal to the angle of incidence of such rays. This is accomplished by the goniometer arrangement previously indicated, wherein the measuring means is rotated at twice the rate of the crystal in a system in which the fluorescent rays are collimated and directed downwardly at an angle below the horizontal and in which the geometric relationships of the sample holder, collimator and the goniometer plate and measurement means, are such as to establish a zeroed alignment of these parts at that angle.

The rays diffracted and reflected by the crystal 22 are also rendered parallel, as by the collimator 13, and then pass into the measuring device, such as the ionization chamber provided by a Geiger counter, indicated in Fig. 1 by the numeral 14. The current produced by ionization of the gas contained in the chamber indicates quantitatively the intensity of the radiations received, and may be measured directly by means such as an electroscope or electrometer, or the current may be amplified for measurement in other ways. The amplified current may also be employed in connection with suitable relays and auxiliary circuits to activate suitable measuring recording and control instruments for purposes such as later described with reference to Fig. 3 and especially Fig. 4.

The sample holder as contemplated by the present invention additionally utilizes a further phenomenon or characteristic of X-ray irradiation of metals. It is known that the fluorescence of irradiated metals may be intensified or enhanced by exposure to the K-rays of other metals having a higher atomic number. Thus, in the sample holder as represented in Fig. 1 and as more particularly described with reference to Fig. 2, the disc 71 is formed of, or faced with a metal of higher atomic number than the subject metal for which the sample contained by holder 5 is to be analyzed. For example, in analyzing for iron, nickel or vanadium in the sample the exposed lower surface of the disc 71 might be either cobalt or copper for iron analysis, copper or zinc for nickel analysis, and chromium or manganese for vanadium analysis. Of these, it is preferred that copper, zinc and chromium be employed in analysis for iron, nickel and zinc respectively. In addition to enhancing the intensity of K-ray emission by the subject metals, the use of a backing disc of the nature and in the manner described advantageously reduces background interference, and initial radiation effectiveness. X-rays which might otherwise pass through the sample without effective contact with the subject elements in the sample, or be scattered at the upper sample interface, are made to contact a metal which in turn emits K-rays having the capacity to produce fluorescence of a subject element which is characteristic of an original X-ray contact. Thus a greater incidence of contact fluorescence is obtained. Background radiation, so called, is also reduced by avoiding the scattering effect produced when X-rays pass through an interface such as between a liquid surface and a gaseous atmosphere above it.

Figure 3:
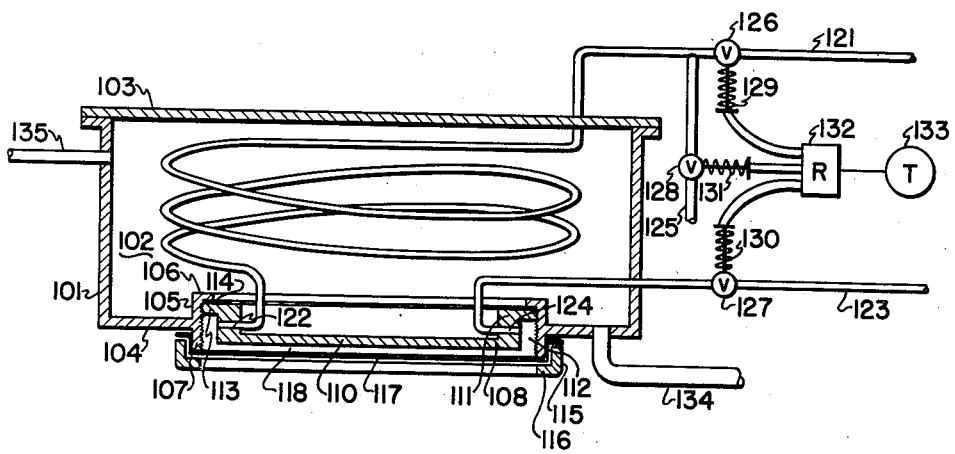
Fig. 3 is a view in vertical section of another form of sample holder according to this invention.

Referring now to Fig. 3, the numeral 101 designates a compartmented container which includes an outer chamber or compartment 102. The chamber 102 is closed at the upper end by means of a removable cover plate 103, and has a bottom wall 104. As shown, the wall 104 has an annular form and is provided with an upstanding rim 105 along its inner peripheral edge. The rim 105 in turn has an annular flange portion 106 extended radially inward therefrom, and a portion 107 which extends outwardly through the bottom wall.

The inner wall of the rim 105, including the extended portion 107 is threaded to receive a closure 108 for the inner end of the upstanding rim, forming therewith an inner chamber or compartment partly within the compartment 102 and opening outwardly through the bottom wall 104. The closure 108 as shown has a center portion 110 and an upstanding rim portion 111 of a diameter less than the rim 105, defining an annular space 112 between them. The rim portion 111 is flanged annularly outward as indicated by the numeral 113, the flange being peripherally threaded to engage the threaded inner wall of the rim 105. The numeral 114 designated an annular gasket engaged between the flanges 106 and 113.

The outer end of the rim 105 is also provided with a closure. As shown, this closure includes an inwardly flanged slip ring 115, wherein the annular flange portion is designated by the numeral 116, and a diaphragm member 117 which is held in place by engagement between the slip ring 115 and the extended wall 107 of the rim 105. The diaphragm 117 is preferably of a material which is substantially non-absorbent for X-rays, such as the material indicated by the numeral 62 in Fig. 2, which is a high molecular weight polyester material produced from ethylene glycol and terephthalic acid by condensation. Alternately as in the structure of Fig. 2, a thin disc of mica, Lindeman glass or a metal such as beryllium may be employed. In the latter instance, it is preferred that the outer wall of the rim portion 107 be threaded exteriorly to receive an interiorly threaded closure ring in place of the slip ring 115.

The closure 108 is further characterized by having a total thickness which is less than the length of the rim 105 from the flange 106 to the outer end of the extended portion 107. Thus the under or reverse surface of the closure 108 is disposed in spaced relation to the upper or obverse surface of the diaphragm 117 or any disc element which may be substituted therefor, and together vertically define a sample receiving chamber 118, communicating peripherally with the annular space 112. Preferably, the relationship between the opposed surfaces of the closure elements 108 and 117 is similar to that as set forth between the under surface of the disc 71 of Fig. 2 and the diaphragm closure 62 thereof. Also, as set forth with reference to the disc 71 of Fig. 2 the closure element 108 is formed of, or faced with a metal of higher atomic number than the metal for which a sample fluid contained in the chamber 118 is to be analyzed.

In the apparatus illustrated in Fig. 3 the number 121 designates an inlet conduit for the introduction of a fluid sample into the sample chamber 118. The conduit 121 is extended through the compartment 102 so as to form a coil therein, and the innermost end of the conduit is connected in fluid communication with the annular space 112, by way of a passageway 122 through the rim portion 111, and thence with the chamber 118. An outlet conduit 123 also communicates with the annular space 112 by way of the passageway 124 in the rim portion 111, and is extended outward therefrom through the container wall. A branch conduit 125 connects with inlet conduit 121 exteriorly of the container 101 as shown.

Each of the conduits 121, 123 and 125 is provided with a valve means such as the valves designated by numerals 126, 127 and 128 respectively. Preferably, these valves are provided for automatic operation, and may be motorized or, as shown, may be solenoid actuated. In the Fig. 3, the numerals 129, 130 and 131 indicate solenoid type valve operating mechanisms electrically connected to a current source through a relay circuit, diagrammatically indicated in the drawing and designated by the numeral 132. In the conduit system as shown, the relay circuit in conjunction with an associated timer mechanism 133 is designed to actuate solenoids 129, 130, and 131 and thereby the valves 126, 127 and 128 in a repetitive time sequence as follows, and starting with all valves closed:

(a) Open valves 127 and 128
(b) Close valve 128 and open valve 126
(c) Close valves 126 and 127

It is further contemplated that the container vessel 101 will be mounted in a suitable housing substantially in the manner of the sample holder 5 of Fig. 1. Such a mounting apparatus would also include the equivalents of the X-ray tube 7 of Fig. 1 focused on the closure disc or diaphragm 117, a goniometer plate, collimators, diffraction crystal and measuring means all in substantially the structural and operating relationships as shown in Fig. 1 and described with reference thereto. The inlet and outlet conduits designated in Fig. 3 by the numerals 134 and 135 respectively correspond to the conduit connections 57 and 28 respectively, and provide for the circulation of heat exchange liquid through the container vessel 101 in indirect heat exchange relation to the fluid in the conduit 121 and the chamber 118 of the apparatus as shown in Fig. 3.

In the employment of the device as illustrated by Fig. 3, the conduit 121 is connected by a suitable source of a material to be analyzed. This might be a process flow line, or a storage reservoir or any other suitable source. The timer mechanism 133 is then adjusted to a time interval adequate to permit the chamber 118 to be filled, purged, and refilled from the sample source, while retaining the sample in the chamber 118 for the length of time required to obtain an optimum irradiation thereof, and to permit measurement of the diffracted secondary K-rays. The conduit 125 in this system may occasionally be omitted and some of the advantages of the invention retained, but preferably it is provided for connection to a source of a metal free purging fluid, preferably miscible with the sample fluid and a diluent therefor. For example, when sampling a gas oil, a water white kerosene or even gasoline might be employed as the purging material.

With the time sequence properly established, a sample material is admitted to the chamber 118 by opening valves 126 and 127. Preferably, the sample material is permitted to flow through the chamber for a brief interval, and then the valves 126 and 127 are closed substantially simultaneously, or in the sequence of valve 127 and then valve 126. The sample is then subjected to X-ray radiation and analysis substantially in the manner described with reference to the operation of the apparatus as shown in Figs. 1 and 2. When the allotted time for this analysis has expired, the valves 127 and 128 are opened and the sample chamber purged. The cycle may then be repeated by closing valve 128 and opening valve 126. Where a separate purge fluid is not employed, purging may be accomplished by the sample material itself, the operation of valves 126 and 127 being timed to permit a period of sample material flow through the chamber 118 between successive analyses. Also, the time cycle may be arranged so as to provide any desired interval between analysis stages in the sequence of operation.

The apparatus as described with reference to Fig. 3, may be employed most suitably in conjunction with a process operation wherein it is desirable that the metal content of a process flow stream be determined in the field, and at more or less frequent intervals. The apparatus as shown in Fig. 3 is particularly adapted to be connected into a commercial scale system substantially as indicated by the showing of Fig. 4. As diagrammatically illustrated the process system includes a vacuum pipe still 200 and separtaor 201 operated to produce a feed stock gas oil for catalyst conversion in a catalytic cracking reactor 202. By close control of temperature and pressure in the vacuum still and separator, a feed stock gas oil may be produced in which the three principal catalyst contaminating metals are present in amounts not substantially greater than 0.5 part per million for nickel, 2.5 parts per million for vanadium, and 3.0 parts per million for iron. The pipe still is connected to the reactor by a process flow line or conduit 203. In this system, as shown, the numeral 204 designates a sample draw off line connected to an X-ray analyzer unit 206 such as described with reference to Fig. 1, and which includes a sample holder of the character described with reference to Fig. 3. A conduit 207 provides for discharge of the sampled material after analysis. Valves 208 and 209 in the conduits 204 and 207 control flow into and from the analyzer apparatus. Although not shown in this representation of the apparatus, the valves 208 and 209 are preferably of the type described with reference to Fig. 3, and including means for automatic operation. It is also contemplated that the apparatus assembly may include accessory equipment, of a character well known in the art, adapted to provide for motorized, reciprocal, and intermittent rotation of the goniometer plate according to a predetermined, timed sequence. Further, it is contemplated that by the use of suitable and well known electrical sensing devices, amplifiers and relays, the signals produced by measuring means such as the Geiger counter shown in Fig. 1 may be employed automatically to actuate controls for process apparatus, such as the pipe still of Fig. 4, in order to maintain any desired metal content in the process flow stream therefrom.

What is claimed is:

1. In an apparatus for X-ray analysis of a liquid material for spectrographic determination of metallic components of said material, wherein a sample portion of said material is subjected to X-ray radiation to produce characteristic K-ray emission by each said metallic component of said material, a holder for such sample portion which comprises a compartmented container including an outer compartment and an inner compartment, said compartments having upper and lower ends, closure means for the lower ends of said compartments, said closure means including a diaphragm substantially non-absorbent for X-rays, disposed in substantially fluid tight relation to said inner compartment lower end, a metallic insert for said inner compartment, including means to support said insert transversely of said inner compartment in closely spaced parallel relation to said diaphragm, to oppose a substantially continuous surface portion of said insert to said diaphragm, and wherein at least said surface portion is of a metal which reacts to X-ray radiation by strong emission of secondary K-rays, means for the introduction of a sample portion of said liquid material into said inner compartment and between said diaphragm and said metallic insert surface portion, and means for circulating a fluid heat exchange medium through said outer compartment in indirect heat exchange relation to a liquid material sample portion contained thereby.

2. In an apparatus for X-ray analysis of a liquid material for the spectrographic determination of metallic components of said material, wherein K-ray emission characteristic of each said metallic component of said material is produced by X-ray radiation of a sample portion of said material, a holder for such sample portion which comprises a compartmented container including an outer compartment having a bottom closure, and an inner compartment substantially concentric with said bottom closure, said inner compartment having a lower end extended and opening outwardly through said outer compartment bottom closure, a closure for the lower end of said inner compartment which includes a diaphragm substantially non-absorbent for X-rays, a metallic insert for said inner compartment, including means to support said insert transversely of said inner compartment in closely spaced parallel relation to said diaphragm, to oppose a substantially continuous surface portion of said insert to said diaphragm, and wherein at least said surface portion is of a metal which reacts to X-ray radiation by strong emission of secondary K-rays, means for the introduction of a sample portion of said liquid material into said inner compartment and between said diaphragm and said metallic insert surface portion, and means for circulating a fluid heat exchange medium through said outer compartment in indirect heat exchange relation to a liquid material sample portion contained thereby.

3. An apparatus according to claim 2, wherein said continuous surface portion of said insert opposed to said diaphragm is of a metal selected from the group which consists of cobalt, copper, zinc, chromium and manganese.

4. In an apparatus for X-ray analysis of a liquid material for the spectrographic determination of metallic components of said material, wherein K-ray emission characteristic of each said metallic component of said material is produced by X-ray radiation of a sample portion of said material, a holder for such sample portion which comprises a first cylindrical wall portion, a second cylindrical wall portion of lesser diameter and greater length than said first wall portion, each wall portion having top and bottom ends, said second wall portion disposed within said first wall portion in concentric, radially spaced relation thereto, the top ends of said wall portions being disposed in substantially the same horizontal plane, and the bottom end of said second wall portion being extended beyond that of said first wall portion, an annular spacer element at each end of said first wall portion secured to said first and second wall portions at their top and bottom end portions respectively and forming therewith an annular chamber, a fluid-tight cap for the bottom end of said second wall portion which includes an annular body portion and a diaphragm closure for the bottom end of said second wall portion of a material which is substantially non-absorbent for X-rays, said closure forming the bottom wall of said sample holder, a cover plate for the top end of said sample holder, a plunger substantially contained within said second wall portion, including a plunger rod having inner and outer end portions of which the latter is extended outwardly through said cover plate and is reciprocally moveable therein and a plunger disc secured to the inner end of said rod and having obverse and reverse surfaces of which the latter faces toward said diaphragm closure and is of a metal which reacts to X-ray radiation by strong emission of secondary K-rays, said disc adapted for a sliding fit in said second wall portion and at least partially defining a plurality of vertical passageways through said disc, said rod and cover also including means to limit movement of said rod and for determining the spacing of said reverse disc surface from said diaphragm closure, and inlet and outlet conduit means for circulating a heat exchange fluid through said annular chamber.

5. In an apparatus for X-ray analysis of a liquid material for the spectrographic determination of metallic components of said material, wherein K-ray emission characteristic of each said metallic component of said material is produced by X-ray radiation of a sample portion of said material, a holder for such sample portion which comprises a compartmented container vessel which includes an outer compartment having a bottom wall and an inner compartment substantially contained concentrically within said outer compartment and having a lower end opening downwardly through said outer compartment bottom wall and an upper end, a closure for the lower end of said inner compartment which includes a diaphragm substantially non-absorbent for X-rays, a metallic insert disposed in the upper end of said inner compartment in closely spaced relation to said diaphragm closure, said insert being of a metal which reacts to X-ray radiation by strong emission of secondary K-rays, conduit means for circulating a heat exchange fluid through said outer compartment, an inlet conduit for said liquid material sample portion extended through said outer compartment into communication with said inner compartment and an outlet conduit therefrom, each of said inlet and outlet conduits including valve means to interrupt flow through said inner compartment.

6. A sample portion holder according to claim 5 wherein said inner compartment is substantially defined by a hollow internally threaded, cylindrical walled member, wherein said upper end of said inner compartment is disposed within said outer compartment, and wherein said metallic insert comprises a peripherally threaded closure for the upper end of said inner compartment adapted for threaded engagement within said cylindrical walled member and to provide a partition separating said inner and outer compartments in indirect heat exchange relationship through said insert.

7. In an apparatus for X-ray analysis of a liquid material for spectrographic determination of metallic components of said material, wherein a sample portion of said material is subjected to X-ray radiation to produce characteristic K-ray emission by each said metallic component of said material, a holder for such sample portion which comprises in combination a compartmented container including an outer compartment and an inner compartment, said compartments having upper and lower ends, closure means for the lower ends of said compartments, said closure means including a diaphragm substantially non-absorbent for X-rays, disposed in substantially fluid tight relation to said inner compartment lower end, a metallic insert for said inner compartment, including means to support said insert transversely of said inner compartment in closely spaced parallel relation to said diaphragm, to oppose a substantially continuous surface portion of said insert to said diaphragm, and wherein at least said surface portion is of a metal which reacts to X-ray radiation by strong emission of secondary K-rays, means for the introduction of a sample portion of said liquid material into said inner compartment and between said diaphragm and said metallic insert surface portion, means for circulating a fluid heat exchange medium through said outer compartment in indirect heat exchange relation to a liquid material sample portion contained thereby, a housing including a top wall and a tubular socket therein adapted to receive said sample holder to expose said closure means internally of said housing, said housing further being adapted to receive an X-ray tube extended thereinto so as to direct X-rays angularly upward toward said bottom closure diaphragm.

No references cited.